(12) United States Patent
Shaheen et al.

(10) Patent No.: US 9,560,147 B2
(45) Date of Patent: Jan. 31, 2017

(54) METHOD AND APPARATUS FOR IDENTIFICATION AND TRANSFER IN INTERNET PROTOCOL MULTIMEDIA SUBSYSTEM COLLABORATIVE SESSIONS

(71) Applicant: InterDigital Patent Holdings, Inc., Wilmington, DE (US)

(72) Inventors: Kamel M Shaheen, King of Prussia, PA (US); Milan Patel, Harrow (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 49 days.

(21) Appl. No.: 14/723,238

(22) Filed: May 27, 2015

(65) Prior Publication Data

US 2015/0256629 A1  Sep. 10, 2015

Related U.S. Application Data

(62) Division of application No. 13/040,990, filed on Mar. 4, 2011, now abandoned.

(Continued)

(51) Int. Cl.
*H04L 29/08* (2006.01)
*H04L 29/06* (2006.01)

(52) U.S. Cl.
CPC ........... *H04L 67/16* (2013.01); *H04L 65/1006* (2013.01); *H04L 65/1016* (2013.01);
(Continued)

(58) Field of Classification Search
CPC .. H04L 67/16; H04L 65/1016; H04L 65/1063; H04L 65/1073; H04L 65/1083; H04L 65/1096; H04L 65/80; H04L 65/1006; H04L 67/141; H04L 67/42
See application file for complete search history.

(56) References Cited

U.S. PATENT DOCUMENTS 7,035,657 B2  4/2006  Chen
7,127,496 B2  10/2006  Isozu
(Continued)

FOREIGN PATENT DOCUMENTS

CA  2605098  5/2012
CN  10105167  8/2007
(Continued)

OTHER PUBLICATIONS

3GPP TR 23.831 v0.3.0 (Mar. 2010).*
(Continued)

*Primary Examiner* — Jae Y Lee
(74) *Attorney, Agent, or Firm* — Invention Mine LLC

(57) ABSTRACT

A method and apparatus are described for performing Internet Protocol (IP) Multimedia Subsystem (IMS) operation. A wireless transmit/receive unit (WTRU) registers an IMS service priority with an IMS network. The IMS service priority indicates the WTRU's priority in receiving IMS services. The WTRU may receive an IMS service from the IMS network based on the WTRU's IMS service priority. The IMS service priority may be indicated using a priority value and the WTRU may use Session Initiation Protocol (SIP) messaging to signal with the IMS network. The WTRU may register the service priority value using a q-value parameter in an SIP Contact field header. The WTRU may also register a public user identity with the IMS network and the public user identity may be shared with other IMS-capable WTRUs.

20 Claims, 10 Drawing Sheets

Related U.S. Application Data

(60) Provisional application No. 61/317,988, filed on Mar. 26, 2010, provisional application No. 61/310,486, filed on Mar. 4, 2010.

(52) U.S. Cl.
CPC ...... *H04L 65/1063* (2013.01); *H04L 65/1073* (2013.01); *H04L 65/1083* (2013.01); *H04L 65/1096* (2013.01); *H04L 65/80* (2013.01); *H04L 67/141* (2013.01); *H04L 67/42* (2013.01)

(56) References Cited

U.S. PATENT DOCUMENTS

| | | |
|---|---|---|
| 7,130,282 B2 | 10/2006 | Black |
| 7,480,721 B2 | 1/2009 | Shaheen |
| 7,499,719 B2 | 3/2009 | Rengaraju |
| 7,667,729 B2 | 2/2010 | Matsumoto |
| 7,813,748 B2 | 10/2010 | Suzuki |
| 7,856,226 B2 | 12/2010 | Wong |
| 7,945,622 B1 | 5/2011 | Pegg |
| 8,005,027 B2 | 8/2011 | Ye |
| 8,077,717 B2 | 12/2011 | Yan |
| 8,078,932 B2 | 12/2011 | Zeira |
| 8,634,381 B2 | 1/2014 | Mahdi |
| 8,670,354 B2 | 3/2014 | Lohmar |
| 2003/0088676 A1 | 5/2003 | Smith |
| 2003/0145054 A1 | 7/2003 | Van Dyke |
| 2004/0205653 A1 | 10/2004 | Hadfield |
| 2004/0230697 A1 | 11/2004 | Kiss |
| 2005/0091380 A1 | 4/2005 | Gonen |
| 2005/0141456 A1 | 6/2005 | Shaheen |
| 2006/0268781 A1 | 11/2006 | Svensson |
| 2007/0285205 A1 | 12/2007 | Matsumoto |
| 2008/0119165 A1 | 5/2008 | Mittal |
| 2008/0268847 A1 | 10/2008 | Mukherjee |
| 2009/0052651 A1 | 2/2009 | Iwakawa |
| 2009/0073938 A1 | 3/2009 | Zhu |
| 2009/0086742 A1 | 4/2009 | Ghai |
| 2009/0103495 A1 | 4/2009 | Shaheen |
| 2009/0190573 A1 | 7/2009 | Siegel |
| 2009/0191869 A1 | 7/2009 | Siegel |
| 2009/0313378 A1 | 12/2009 | Mahdi |
| 2009/0319691 A1 | 12/2009 | Buckley |
| 2010/0034168 A1 | 2/2010 | Mahdi |
| 2010/0036958 A1 | 2/2010 | Mahdi |
| 2010/0069101 A1 | 3/2010 | Mahdi |
| 2010/0082810 A1* | 4/2010 | Patel ............... H04W 36/24 709/225 |
| 2010/0279670 A1 | 11/2010 | Ghai |
| 2010/0287406 A1 | 11/2010 | Ishii |
| 2010/0312832 A1 | 12/2010 | Allen |
| 2010/0312841 A1 | 12/2010 | Doken |
| 2010/0312897 A1 | 12/2010 | Allen |
| 2011/0040836 A1 | 2/2011 | Allen |
| 2011/0110275 A1* | 5/2011 | Shaheen ............ H04L 65/1089 370/260 |
| 2011/0161508 A1 | 6/2011 | Kim |
| 2011/0209188 A1 | 8/2011 | Petersson |
| 2011/0238845 A1 | 9/2011 | Keller |
| 2012/0011257 A1 | 1/2012 | Kim |
| 2012/0115483 A1 | 5/2012 | Noldus |

FOREIGN PATENT DOCUMENTS

| | | |
|---|---|---|
| CN | 101015167 | 8/2007 |
| CN | 101364874 A | 2/2009 |
| CN | 101383765 | 3/2009 |
| EP | 1819092 | 8/2007 |
| EP | 1848163 | 10/2007 |
| EP | 1909451 A1 | 4/2008 |
| EP | 2061212 | 5/2009 |
| EP | 2073479 A1 | 6/2009 |
| EP | 2083547 | 7/2009 |
| EP | 2093968 A1 | 8/2009 |
| EP | 2239893 A1 | 10/2010 |
| EP | 2257104 | 12/2010 |
| EP | 2528407 A1 | 11/2012 |
| JP | 10242962 A2 | 9/1998 |
| JP | 2007104163 | 4/2007 |
| JP | 2008067083 | 3/2008 |
| JP | 2008078935 | 4/2008 |
| JP | 2008092579 | 4/2008 |
| JP | 2008148169 | 6/2008 |
| JP | 2009164841 | 7/2009 |
| WO | 2006006897 | 1/2006 |
| WO | 2006075677 | 7/2006 |
| WO | 2007142866 | 12/2007 |
| WO | 2008038200 A2 | 4/2008 |
| WO | 2008072660 | 6/2008 |
| WO | 2009013405 | 1/2009 |
| WO | 2009021549 | 2/2009 |
| WO | 2009088814 | 7/2009 |
| WO | 2009122241 | 10/2009 |
| WO | 2009124943 A1 | 10/2009 |
| WO | 2009134051 | 11/2009 |
| WO | 2010031351 | 3/2010 |
| WO | 2010132820 | 11/2010 |

OTHER PUBLICATIONS

3GPP TS 23.237 v10.0.0 (Dec. 2009).*
3GPP TS 23.237 v8.6.0 (Dec. 2009).*
3GPP TR 23.838 v9.0.0 (Jun. 2009).*
3GPP TS 23.292 v10.0.0 (Mar. 2010).*
English Translation of foreign patent publication CN 101364874 A, published on Feb. 11, 2009.
Abstract for Chinese Publication, CN 101015167. Publication date Aug. 8, 2007.
Abstract for Chinese Publication, CN 101364874A. Publication date Feb. 11, 2009.
Bertrand, "The IP Multimedia Subsystem in Next Generation Networks," May 30, 2007. http://www.tele.pw.edu.pl/~mareks/auims/IMS_an_overview-1.pdf.
Handley et al., "SIP: Session Initiation Protocol," Internet Engineering Task Force, Request for Comment 2543, Mar. 1999.
Levin et al., "Conveying Feature Tags with the Session Initiation Protocol (SIP) REFER Method," Internet Engineering Task Force, Request for Comment 4508, May 2006.
Panasonic et al., 'DHCP Discovery of ANDSF for UE While Roaming,' C1-101234,3GPP TSG-CT WG1 Meeting #63, San Francisco, California, USA, Feb. 22-26, 2010.
Research in Motion, "Addition of Media Feature Tag for Indicating IUT Controller Capability," C1-1012513GPP, TSG-CT WG1 Meeting #63, San Francisco, California, USA, Feb. 22-26, 2010.
Rosenberg et al., "Caller Preferences for the Session Initiation Protocol (SIP)," Internet Engineering Task Force, Request for Comment 3841, Aug. 2004.
Rosenberg et al., "SIP: Session Initiation Protocol," Internet Engineering Task Force, Request for Comment 3261, Jun. 2002.
Third Generation Partnership Project, 'Technical Specification Group Core Network and Terminals; IP Multimedia (IM) Core Network (CN) Subsystem Inter-UE Transfer Enhancements; Stage 3 (Release 10),' 3GPP TR 24.837 v1.1.0, Feb. 2011.
Third Generation Partnership Project, 'Technical Specification Group Core Network and Terminals; IP Multimedia Call Control Protocol Based on Session Initiation Protocol (SIP) and Session Description Protocol (SDP); Stage 3 (Release 10),' 3GPP TS 24.229 vl0.2.0, Dec. 2010.
Third Generation Partnership Project, 'Technical Specification Group Services and Architecture; IP Multimedia Subsystem (IMS) Service Continuity; Stage 2 (Release 10),' 3GPP TS 23.237 V10.0.0 (Dec. 2009).
Third Generation Partnership Project, 'Technical Specification Group Services and Architecture; IP Multimedia Subsystem (IMS) Service Continuity; Stage 2 (Release 8),' 3GPP TS 23.237 v8.6.0, Dec. 2009.

(56) References Cited

OTHER PUBLICATIONS

Third Generation Partnership Project, 'Technical Specification Group Services and Architecture; IP Multimedia Subsystem (IMS) Service Continuity; Stage 2 (Release 9),' 3GPP TS 23.237 v9.3.0, Dec. 2009.
Third Generation Partnership Project, 'Technical Specification Group Services and Aspects; IP Multimedia Subsystem (IMS) Service Continuity; Stage 2 (Release 10),' 3GPP TS 23.237 v10.4.1, Jan. 2011.
Third Generation Partnership Project, 'Technical Specification Group Services and System Aspects; IP Multimedia Subsystem (IMS) Centralized Services; Stage 2 (Release 8),' 3GPP TS 23.292 v8.6.0, Dec. 2009.
Third Generation Partnership Project, 'Technical Specification Group Services and System Aspects; IP Multimedia Subsystem (IMS) Centralized Services; Stage 2 (Release 8),' 3GPP TS 23.292 v8.8.0, Jun. 2010.
Third Generation Partnership Project, 'Technical Specification Group Services and System Aspects; IP Multimedia Subsystem (IMS) Centralized Services; Stage 2 (Release 9),' 3GPP TS 23.292 v9.7.0, Sep. 2010.
Third Generation Partnership Project, 'Technical Specification Group Services and System Aspects; IP Multimedia Subsystem (IMS) Service Continuity; Inter-UE Transfer Enhancements; Stage 2 (Release 10),' 3GPP TR 23.831 v10.0.0, Sep. 2010.
Third Generation Partnership Project, 'Technical Specification Group Services and System Aspects; IP Multimedia Subsystem (IMS) Service Continuity; Stage 2 (Release 8),' 3GPP TS 23.237 V8.7.0 (Mar. 2010).
Third Generation Partnership Project, 'Technical Specification Group Services and System Aspects; IP Multimedia Subsystem (IMS) Service Continuity; Stage 2 (Release 9),' 3GPP TS 23.237 V9.7.0 (Dec. 2010).
Third Generation Partnership Project, Technical Specification Group Services and System Aspects; IP Multimedia Subsystem (IMS) Centralized Services; Stage 2 (Release 10), 3GPP TS 23.292 v10.2.0, Sep. 2010.
Third Generation Partnership Project, Technical Specification Group Services and System Aspects; IP Multimedia Subsystem (IMS) Centralized Services; Stage 2 (Release 9), 3GPP TS 23.292 v9.4.0, Dec. 2009.
Third Generation Partnership Project, Technical Specification Group Services and System Aspects; IP Multimedia Subsystem (IMS) Service Continuity; Inter-UE Transfer Enhancements; Stage 2 (Release 10),3GPPTR 23.831 v0.2.1, Feb. 2010.
Third Generation Partnership Project, "Technical Specification Group Services and System Aspects; IP Multimedia Subsystem (IMS) service continuity enhancements; Service, policy and interaction; Stage 2 (Release 9)," 3GPP TR 23.838 V9.0.0 (Jun. 2009).
Ericsson, "Allowing any UE to request the Controller UE to initiate media flow transfer and/or Collaborative Session Control transfer," 3GPP TSG SA WG2 Meeting #72, TD S2-092246 (Mar. 30-Apr. 3, 2009).
Ericsson, 'SCC AS providing Controller UE with information about Collaborative Session changes done by Controllee UE,' 3GPP TSG SA WG2 Meeting #72, S2-092803 (Mar. 30-Apr. 3, 2009).
Starent Networks, "Controller Initiated Release collaborative session," 3GPP TSG SA WG2 Meeting #72, S2-091849 (Mar. 30-Apr. 3, 2009).
Third Generation Partnership Project, 'Technical Specification Group Services and Architecture; IP Multimedia Subsystem (IMS) Service Continuity; Stage 2 (Release 10),' 3GPP TS 23.237 v10.3.0, Sep. 2010.
Third Generation Partnership Project, 'Technical Specification Group Services and Architecture; P Multimedia Subsystem (IMS) Service Continuity; Stage 2 (Release 8),' 3GPP TS 23.237 v8.5.0, Sep. 2009.

Third Generation Partnership Project, 'Technical Specification Group Services and Architecture; P Multimedia Subsystem (IMS) Service Continuity; Stage 2 (Release 9),' 3GPP TS 23.237 v9.2.0, Sep. 2009.
Third Generation Partnership Project, Technical Specification Group Services and Architecture; IP Multimedia Subsystem (IMS) Service Continuity; Stage 2 (Release 9), 3GPP TS 23.237 v9.6.0, Sep. 2010.
Handley et al. (RFC 4566 'SDP: Session Description Protocol', Network Working Group, University of Glasgow, Jul. 2006).
Hutton et al., "An Architecture for Media Recording Using the Session Initiation Protocol," Internet Engineering Task Force, Feb. 2010.
Imai et al., "Duplicate a SIP Session," Internet Engineering Task Force, Dec. 2007.
Qualcomm Europe, 'Discussion on How to Initiate Inter-UE Transfer Operation,' C1-092464,3GPP TSG CT WG1 Meeting #59, Los Angeles, California, USA, Jun. 22-26 2009.
Rehor et al., "Requirements for SIP-Based Media Recording (SIPREC)," Internet Engineering Task Force, Mar. 2010.
Third Generation Partnership Project, "Technical Specification Group Core Network and Terminals; IP Multimedia (IM) Core Network (CN) subsystem inter-UE transfer enhancements; Stage 3 (Release 10)," 3GPP TR 24.837 1.2.0 (Mar. 2011).
Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 vO.3.0, Mar. 2010.
"3rd Generation Partnership Project; Technical Specification Group Services and System Aspects; IP Multimedia Subsystem (IMS) Service Continuity; Inter-UE Transfer enhancements; Stage 2 (Release 10)" 3GPP Standard; 3GPP TR 23.831, 3rd Generation Partnership Project (3GPP), Mobile Competence Centre ; 650, Route Des Lucioles ; F-06921 Sophia-Antipolis Cedex ; France, No. V0.2.1, Feb. 12, 2010.
Abstract for IS2000A7, dated Nov. 2, 1971.
Johnston et al., "Session Initiation Protocol Services Examples," SIPPING Working Group, Inter-Draft, draft-ietf-sipping-services-examples-13 (Jul. 16, 2007).
Nokia et al., "Clarify determining the capabilities of an UE to act as Controller/Controllee UE," 3GPP TSG SA WG2 Meeting #72, S2-091958 (Mar. 30-Apr. 3, 2009).
Notification of International Search Report and the Written Opinion and ISR and WO for PCT/US2011/020856, dated Apr. 20, 2011, 12 pages.
Notification of Transmittal of the International Preliminary Report on Patentability for PCT/US2010/056734 dated Feb. 29, 2012, 18 pages.
Notification of Transmittal of the International Preliminary Report on Patentability for PCT/US2010/061881 dated Mar. 29, 2012, 19 pages.
Third Generation Partnership Project, 'Technical Specification Group Services and Architecture: IP Multimedia Subsystem (IMS) Service Continuity; Stage 2 (Release 8),' 3GPP TS 23.237 v8.3.0, (Mar. 2009).
Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 v0.1.0, Nov. 2009.
Third Generation Partnership Project, "Technical Specification Group Services and System Aspects; IP Multimedia Subsystem (IMS) Service Continuity; Stage 2 (Release 10)," 3GPP TS 23.237 V10.4.0 (Dec. 2010).
Written Opinion of the International Preliminary Examining Authority for PCT/US2010/061881 dated Nov. 25, 2011, 11 pages.
"3rd Generation Partnership Project; Technical Specification Group Services and Architecture; IP Multimedia Subsystem (IMS) Service Continuity Enhancements; Service Policy and interaction; Stage 2 (Release 9)", 3GPP Standard; 3GPP TS 23.838, 3rd Generation Partnership Project (3GPP), Mobile Competence Centre; 650,

(56) References Cited

OTHER PUBLICATIONS

Route Des Lucioles; F-06921 Sophia-Antipolis Cedex; France, No. V1.1.0, Apr. 2009.

\* cited by examiner

METHOD AND APPARATUS FOR IDENTIFICATION AND TRANSFER IN INTERNET PROTOCOL MULTIMEDIA SUBSYSTEM COLLABORATIVE SESSIONS

CROSS REFERENCE TO RELATED APPLICATIONS

This application is a divisional application of U.S. application Ser. No. 13/040,990 filed on Mar. 4, 2011, which claims the benefit of U.S. provisional application No. 61/310,486, filed on Mar. 4, 2010; and U.S. provisional application No. 61/317,988, filed on Mar. 26, 2010, the contents of which are hereby incorporated by reference herein.

FIELD OF INVENTION

This application is related to communications.

BACKGROUND

Internet Protocol (IP) Multimedia Subsystem (IMS) is an architectural framework for providing multimedia services across a variety of access platforms. IMS facilitates multimedia service creation and deployment based on Internet protocols allowing IMS subscribers to access personalized interactive, multimedia services, on any device, and anywhere. IMS is access-agnostic, whereby service delivery is independent of the underlying access platform and the use of Internet protocols in IMS allows for interoperability among the access platforms. IMS also leads to savings in network infrastructure, administration and management. Further, IMS allows for the migration of Circuit Switched (CS) services like voice telephony to the Packet Switched (PS) domain by using separate control and bearer functions and featuring an overlay service delivery network on top of a packet switch network infrastructure.

In IMS, media sessions may be directed to any one of multiple IMS-capable devices communicating via an IMS network. An IMS network may therefore face decisions regarding the routing of media sessions and how to signal such determinations. Additionally, multiple IMS-capable devices may be served by multiple IMS networks and the networks' functional entities, whereby the various networks may face decisions regarding the management of IMS sessions that they may seek to resolve without creating unnecessary signaling traffic.

It is therefore desirable to have a method and apparatus for IMS-capable devices to indicate routing preferences to an IMS network. It is further desirable to have a method and apparatus for IMS networks and IMS-capable devices to efficiently identify and transfer their roles.

SUMMARY

A method and apparatus are described for performing Internet Protocol (IP) Multimedia Subsystem (IMS) operation. A wireless transmit/receive unit (WTRU) registers an IMS service priority with an IMS network. The IMS service priority indicates the WTRU's priority in receiving IMS services. The WTRU may receive an IMS service from the IMS network based on the WTRU's IMS service priority. The IMS service priority may be indicated using a priority value and the WTRU may use Session Initiation Protocol (SIP) messaging to signal with the IMS network. The WTRU may register the service priority value using a q-value parameter in an SIP Contact field header. The WTRU may also register a public user identity with the IMS network and the public user identity may be shared with other IMS-capable WTRUs.

BRIEF DESCRIPTION OF THE DRAWINGS

A more detailed understanding may be had from the following description, given by way of example in conjunction with the accompanying drawings wherein.

DETAILED DESCRIPTION

Figure 1A:
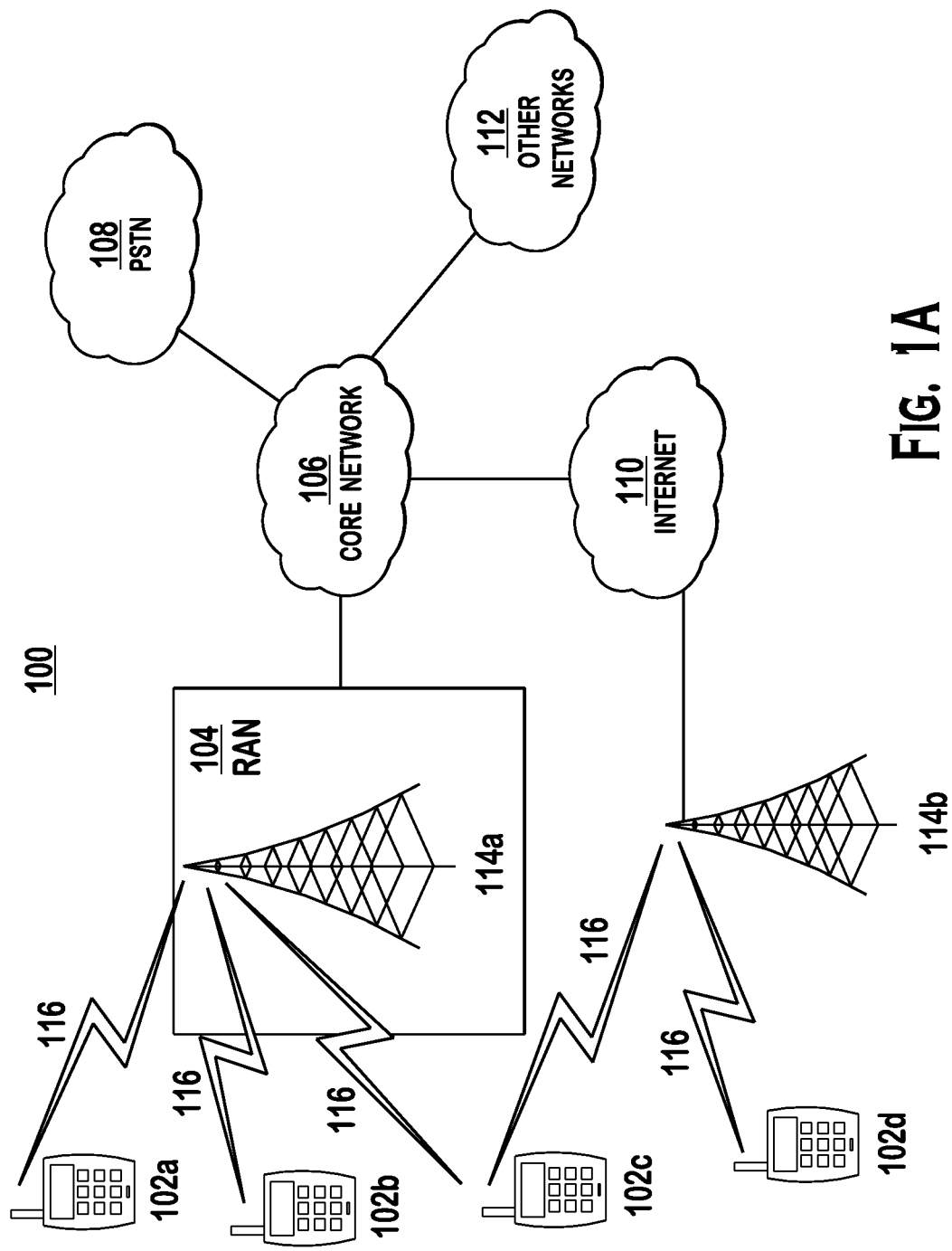
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
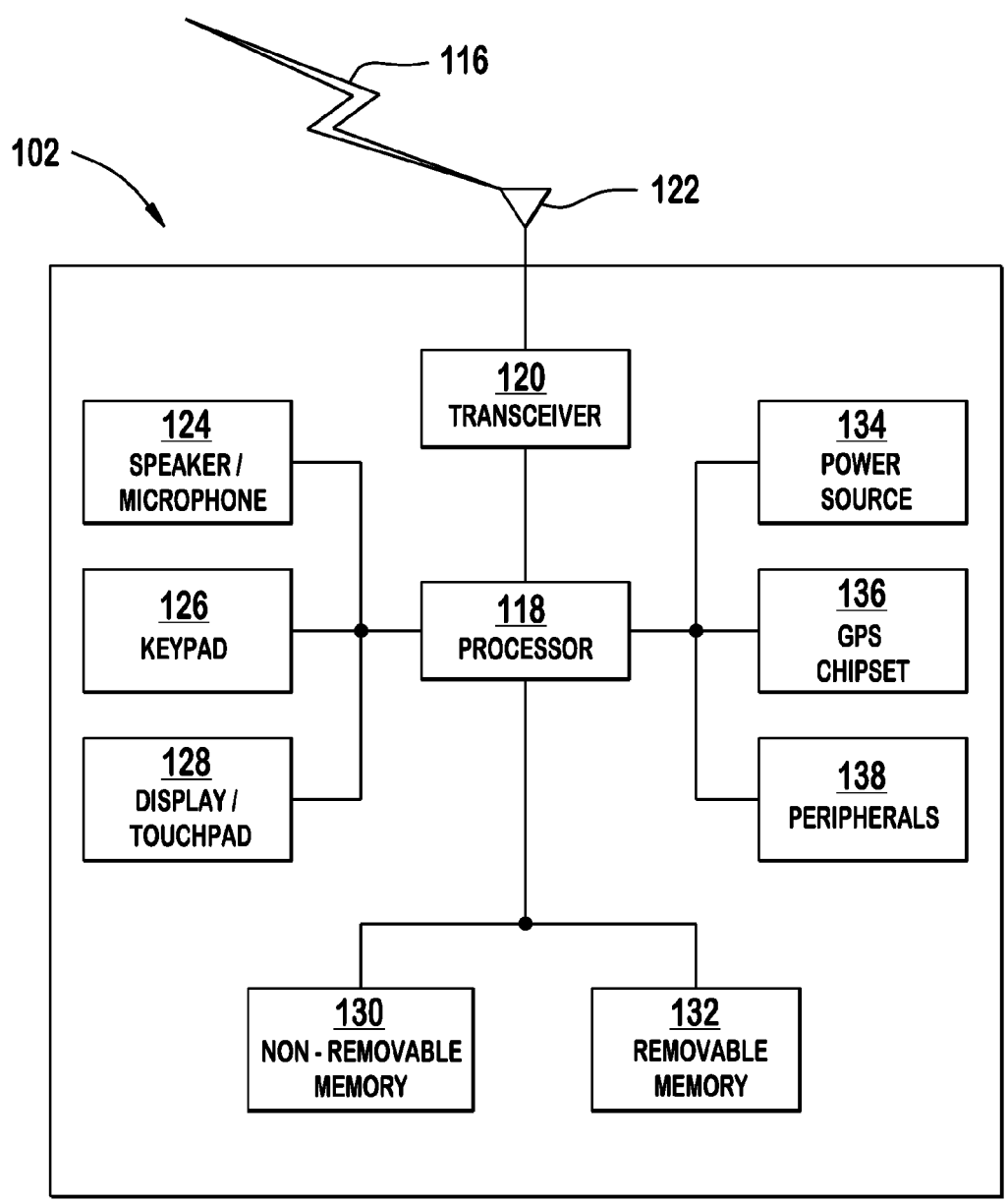
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
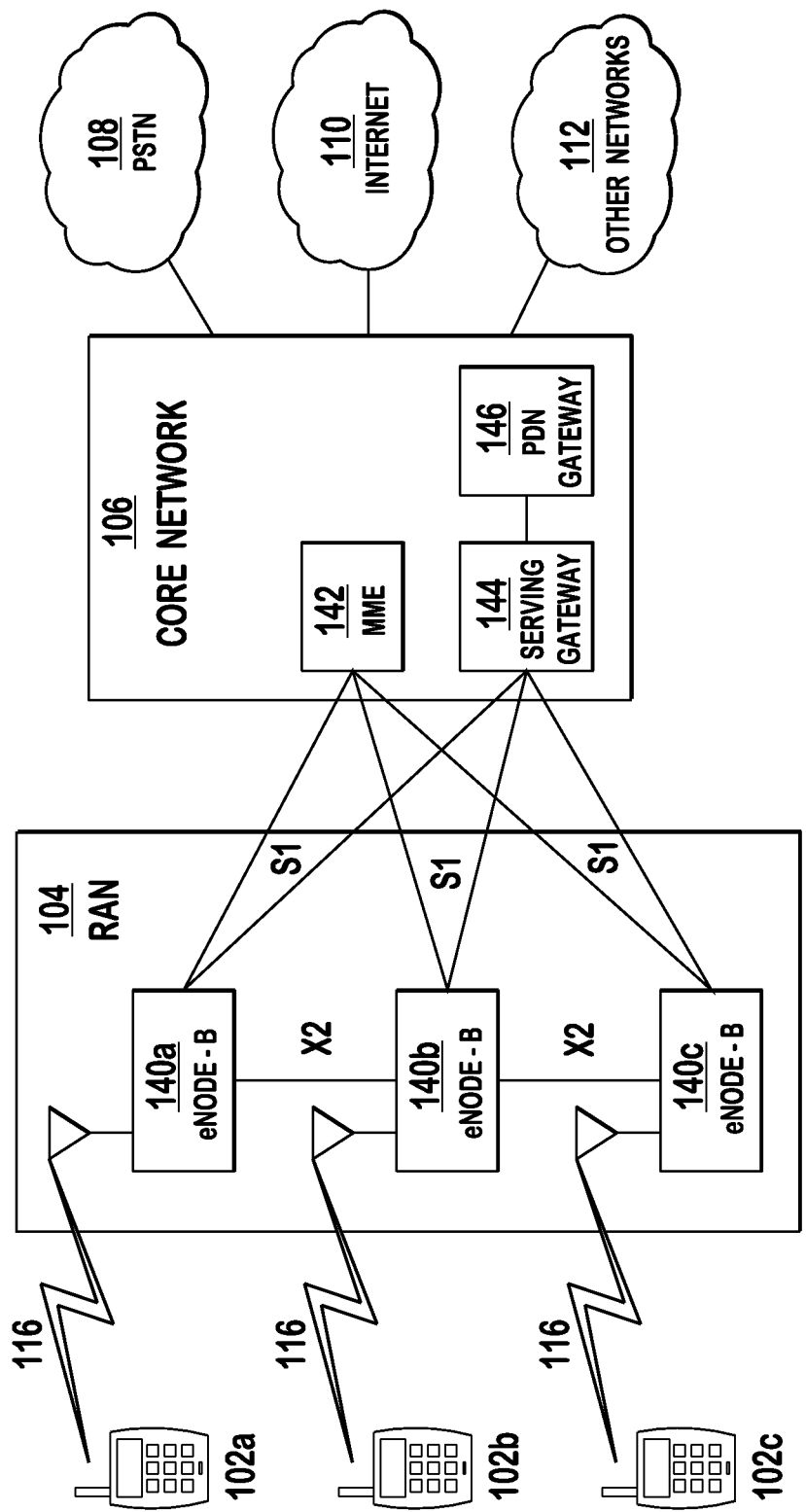
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2A:
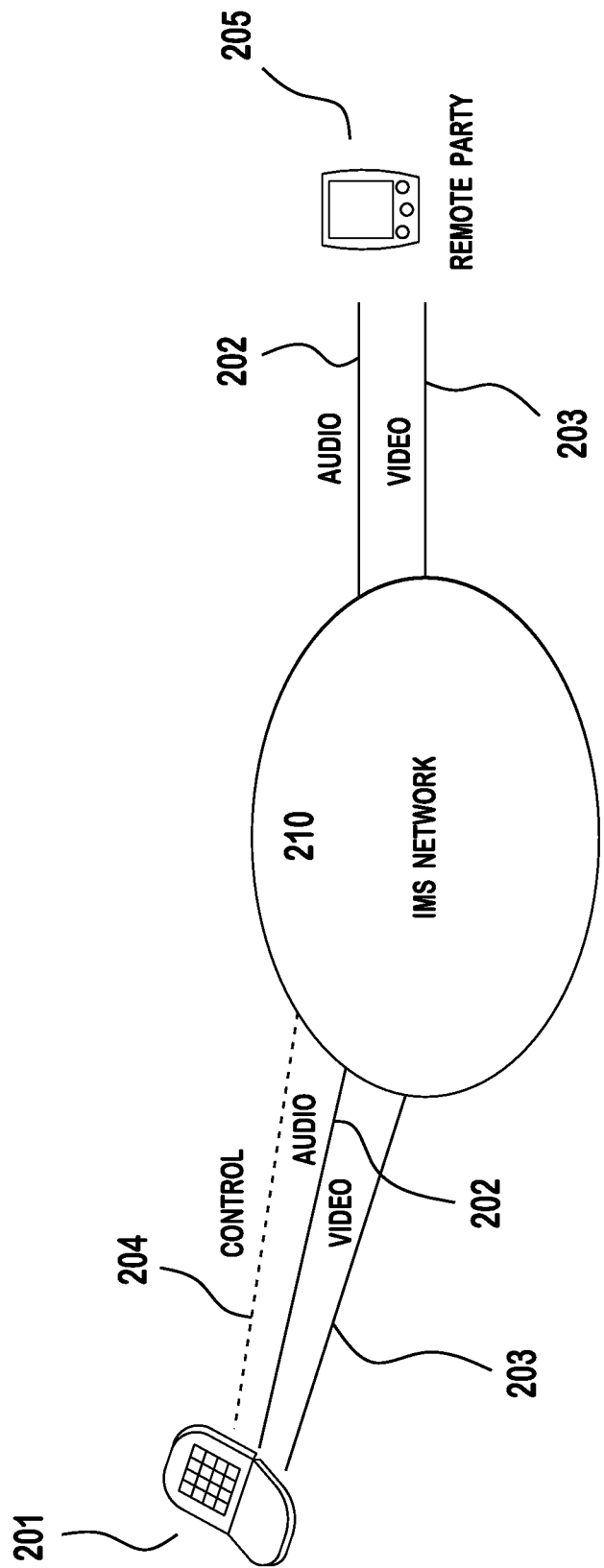
FIG. 2A shows a WTRU in an IMS session with a remote party.

FIG. 2A shows a WTRU 201 in an IMS session with a remote party 205. The IMS session is conducted over the IMS network 210. The WTRU 201 may have any number of ongoing media sessions with the remote party. For example, FIG. 2A shows an audio session 202 and a video session 203. These sessions are exemplary and other multimedia sessions may be used. The IMS network 210 hosts IMS services and provides session and media control. It manages a WTRU's service interactions and establishes, monitors, supports and releases multimedia sessions.

Further, the WTRU 201 maintains IMS control signaling 204 with the IMS network 210. The WTRU may use the IMS control signaling 204 to exercise session control capabilities. IMS control signaling allows a WTRU to accept or reject an incoming request for the establishment of a media session from a remote party. The WTRU 201 executes IMS control signaling on the control path 204. The IMS network 210 is on the recipient end of the WTRU's IMS control signaling 204.

Figure 2B:
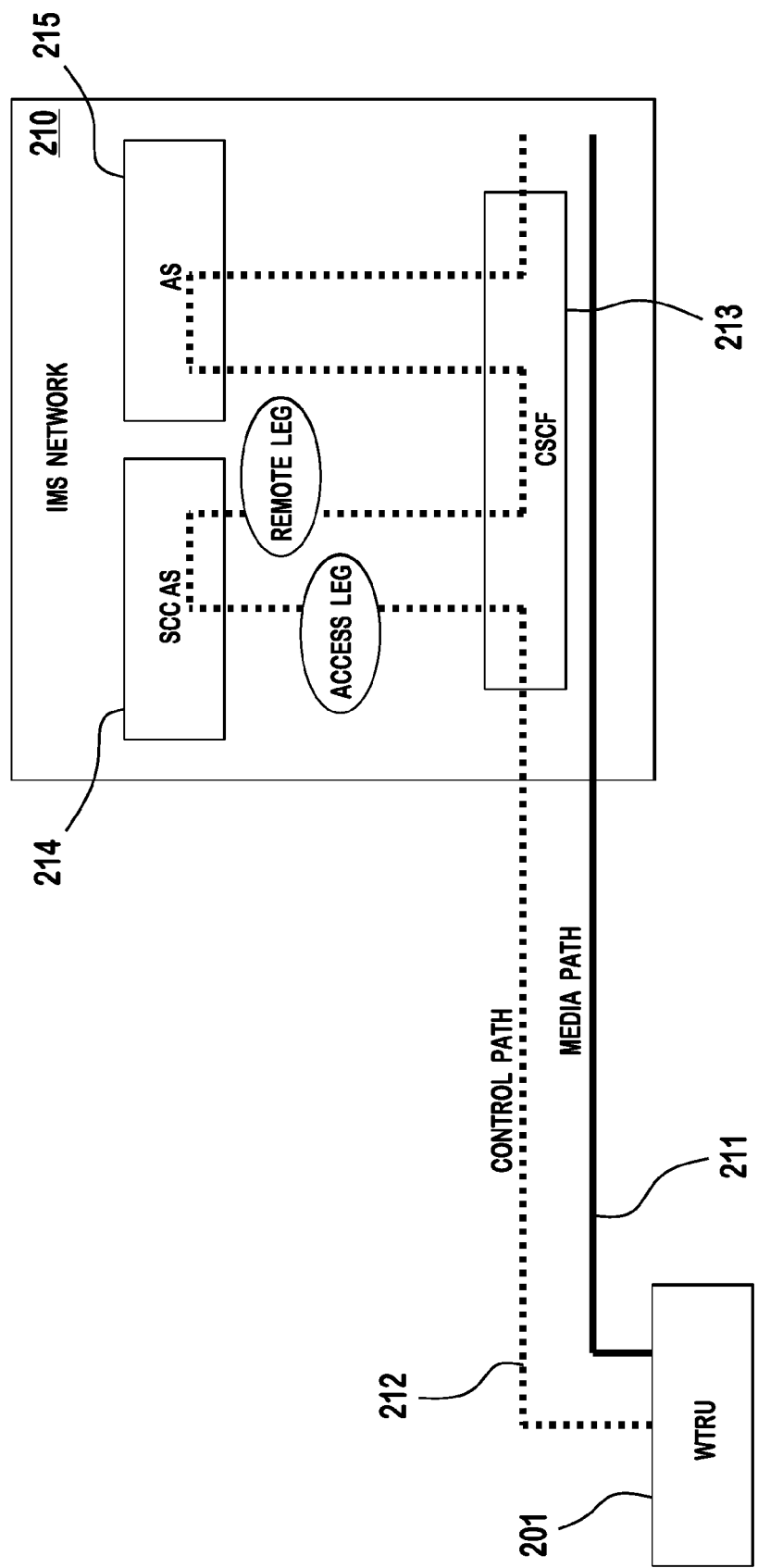
FIG. 2B shows functional entities within an IMS network.

FIG. 2B shows functional entities of an IMS network 210. The Call Session Control Function (CSCF) entity 213 sits on the path of IMS control signaling amongst WTRUs, remote parties, and other IMS network entities. The CSCF entity may inspect the messaging of WTRUs, remote parties, and other IMS network entities. The CSCF entity decides to which application server (AS) control messaging is forwarded to provide for IMS services. The CSCF entity provides routing services and enforces the policies of network operators. The CSCF entity also handles WTRU registrations.

The IMS network may use one or more ASs. The one or more ASs are configured to host and execute IMS services and to interface with the CSCF 213. Service Centralization and Continuity AS (SCC AS) 214 anchors IMS sessions and enables service continuity for media sessions including providing for and executing the transfer of media sessions amongst WTRUs, combining and dividing media flows, and the addition of media flows. Aside from the SCC AS 214, other ASs, such as AS 215 shown in FIG. 2B, may interface with the CSCF 213 to provide for other IMS-related services.

WTRU 201, as shown in FIG. 2B, has control signaling with the IMS network 210, represented by control path 212. WTRU 201 may also have any number of IMS media sessions that are collectively represented by media path 211. FIG. 2B also shows access and remote legs for an IMS session. An access leg is a control leg between a WTRU and the SCC AS and a remote leg is a control leg between the SCC AS and a remote party.

Figure 2C:
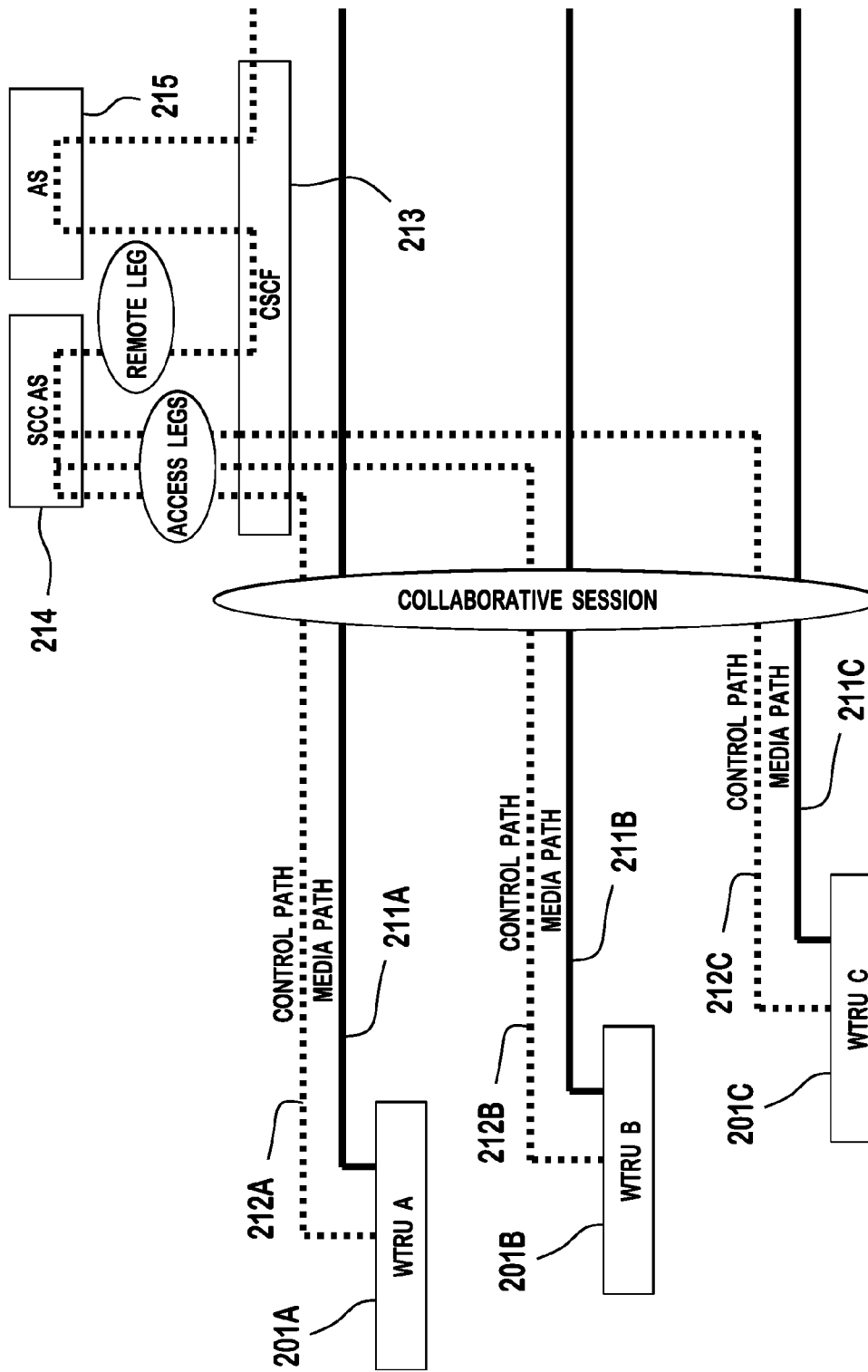
FIG. 2C shows multiple WTRUs served by a single IMS network in a collaborative IMS session.

Multiple WTRUs may be engaged in a single collaborative IMS session with a remote party through an IMS network. FIG. 2C shows multiple WTRUs served by a single IMS network in a collaborative IMS session. In FIG. 2C, WTRUs 201A-C (collectively hereinafter referred to by the numeral alone, WTRUs 201) are involved in a collaborative IMS session with a remote party (not shown). Each WTRU 201 has a control path 212 A-C and a media path 211A-C. The media paths 211 represent the ongoing media sessions of the WTRUs 201. The control paths 212 represent the control signaling for the WTRUs 201.

While all of the WTRUs 201 are involved in a collaborative IMS session, one of the WTRUs 201 functions as a controller WTRU for the collaborative session. In FIG. 2C, WTRU A 201A functions as the controller WTRU for the collaborative session. As a controller, WTRU A 201A is able to execute Inter-Device Transfer (IDT) procedures by which WTRU A 201A may add, transfer, duplicate, and remove media sessions on any WTRU 201 involved in the collaborative session. Furthermore, the service profile of the controller WTRU in a collaborative session, such as WTRU A 201A, may determine the services available on the paths between the collaborative session and the remote party.

Although involved in a collaborative session with all WTRUs 201, the remote party may not be aware that one or more of its media sessions are with controllee WTRUs, such as WTRU B 201B and WTRU C 201C. In a collaborative session, the remote party may only be aware of a controller WTRU, WTRU A 201A. The controller WTRU A 201A uses control path 212A for collaborative session control messaging, as well as for control signaling associated with its own media path 211. Within the collaborative session, controllee WTRUs B 201B and C 201C are engaged in media sessions via media paths 211B-C, respectively. Controllee WTRUs B 201B and C 201C also use control paths 212B-C for control signaling.

Within a collaborative session, controllee WTRUs are subordinate to the controller WTRU for IDT procedures. For example, a controller WTRU may remove a media session from a controllee WTRU. Additionally, if a controllee WTRU seeks to establish a media session, the controllee WTRU may request such establishment from a controller WTRU and the controller WTRU may accept or reject this request.

In FIG. 2C, Service Centralization and Continuity Application Server (SCC AS) 214 serves as an anchor SCC AS, that manages session control signaling between the WTRUs and the remote party. Furthermore, SCC AS 214 enables service continuity for media sessions in the collaborative session and provides for and executes IDT procedures. While in FIG. 2C, only one SCC AS serves the collaborative session, in other scenarios multiple WTRUs in a collaborative session may each have their own SCC AS that acts as a proxy to an anchor SCC AS. FIG. 2C also shows IMS network entities CSCF 213 and AS 215.

Control signaling via a control path in an IMS session, as shown in FIGS. 2B-C, may utilize a signaling protocol such as Session Initiation Protocol (SIP). SIP, as known in the art, is a signaling protocol that allows for establishing, modifying, terminating, adding, and duplicating IMS multimedia sessions. SIP is a text-based protocol, where messages may take one of two forms: requests and responses. SIP requests include a REGISTER request, which may be used by a WTRU to register a Public User Identity (PUI) that is associated with the WTRU with the IMS network. Other examples of SIP requests include an INVITE request, which may be used to establish a media session between a WTRU and a remote party, and ACK request, which may be used to confirm that a response has been received. SIP response codes include a provisional response, i.e., 1xx, which may be used to indicate the request was received and is being processed and a success response, i.e., 2xx, which may be use to indicate the action was successfully received and accepted.

SIP headers may be used by WTRUs and the IMS network that is utilizing SIP messaging. Some SIP headers include "To" (the address of the intended recipient), "From" (the address of the sender), and "Contact" (address information that identifies the resource requested or the request originator, depending on whether it is a header for a request or a response).

In IMS, a WTRU may be registered in the IMS network using a Public User Identity (PUI). A PUI may be a SIP Uniform Resource Identifier (URI), such as an e-mail address, or a Tel URI, such as a telephone number. An IMS network may contact a WTRU by addressing the WTRU's PUI. Multiple WTRUs may share the same PUI. For instance, an IMS subscriber may have multiple WTRUs sharing the same PUI under one IMS subscription.

A WTRU may register its capabilities with the IMS network. A WTRU that is capable of controlling a collaborative session may register as a collaborative session controller WTRU with the IMS network. Furthermore, a WTRU that is capable of media control may register as such. A media controller WTRU, regardless of being a controller WTRU or a controllee WTRU of a collaborative session, may have certain defined media control privileges within a collaborative session. A WTRU may update or change its registered profile with the network at any time. To register its capabilities, a WTRU may use a feature tag within an SIP Contact header. For instance, a WTRU seeking to register collaborative session control capabilities may use a feature tag such as g.3gpp.iut="controller" and a WTRU seeking to register media control capabilities may use a feature tag such as g.3gpp.iut="media-controller". A WTRU may include the feature tags indicating its IMS capabilities when utilizing the SIP REGISTER request to contact the IMS network.

The IMS network may maintain a profile of a WTRU's capabilities. This profile may be influenced by the capabilities that the WTRU registered with the network or by other information within the network's knowledge. The network may rely upon the WTRU's registered capabilities or information within the service profile in providing IMS services, such as media session routing or determining whether a WTRU is permitted to perform IMS actions. For instance, within an IMS network, an SCC AS that is responsible for media session continuity may use registered WTRU capabilities or profile information to influence media session routing. In the event that it receives an incoming media session request, an SCC AS may indicate to a CSCF a preference for the session to be routed to a registered controller WTRU. A CSCF may then use this preference to route the media session to the controller registered WTRU.

In SIP, an SCC AS may indicate routing preferences to a CSCF using IETF RFC 3841 headers and parameters. For instance, an SCC AS may add an Accept-Contact header field in an SIP request with a controller WTRU feature tag and an "explicit" parameter, thereby requiring that the request be routed to a WTRU registered with controller capabilities. Upon receiving the header field and controller feature tag in the SIP request, a CSCF routes the request to a WTRU with registered controller capabilities. If no WTRUs have registered controller capabilities, the request is routed to a WTRU that is not a registered controller. A SCC AS may also indicate routing preferences by adding an SIP Contact header field with a "require" parameter.

A WTRU may register a priority value with the IMS network. The priority value may indicate to the IMS network a WTRU's priority in comparison to other WTRUs that may also be registered with the IMS network under the same PUI. The priority value may also indicate to the IMS network the WTRU's preference level for receiving IMS sessions. A priority value may be used by the IMS network in IMS management and providing IMS services, such as determining where to establish or route media sessions. A higher priority value associated with a WTRU may indicate to the network a greater preference for the establishment and routing of media sessions to that WTRU. For instance, if multiple WTRUs having the same PUI are registered as controllers with the IMS network, the CSCF within the IMS network may route an incoming media session to the WTRU with the higher priority value. In one embodiment, a WTRU may register a priority value with the IMS network using the q-value parameter in the SIP Contact header field.

Figure 3:
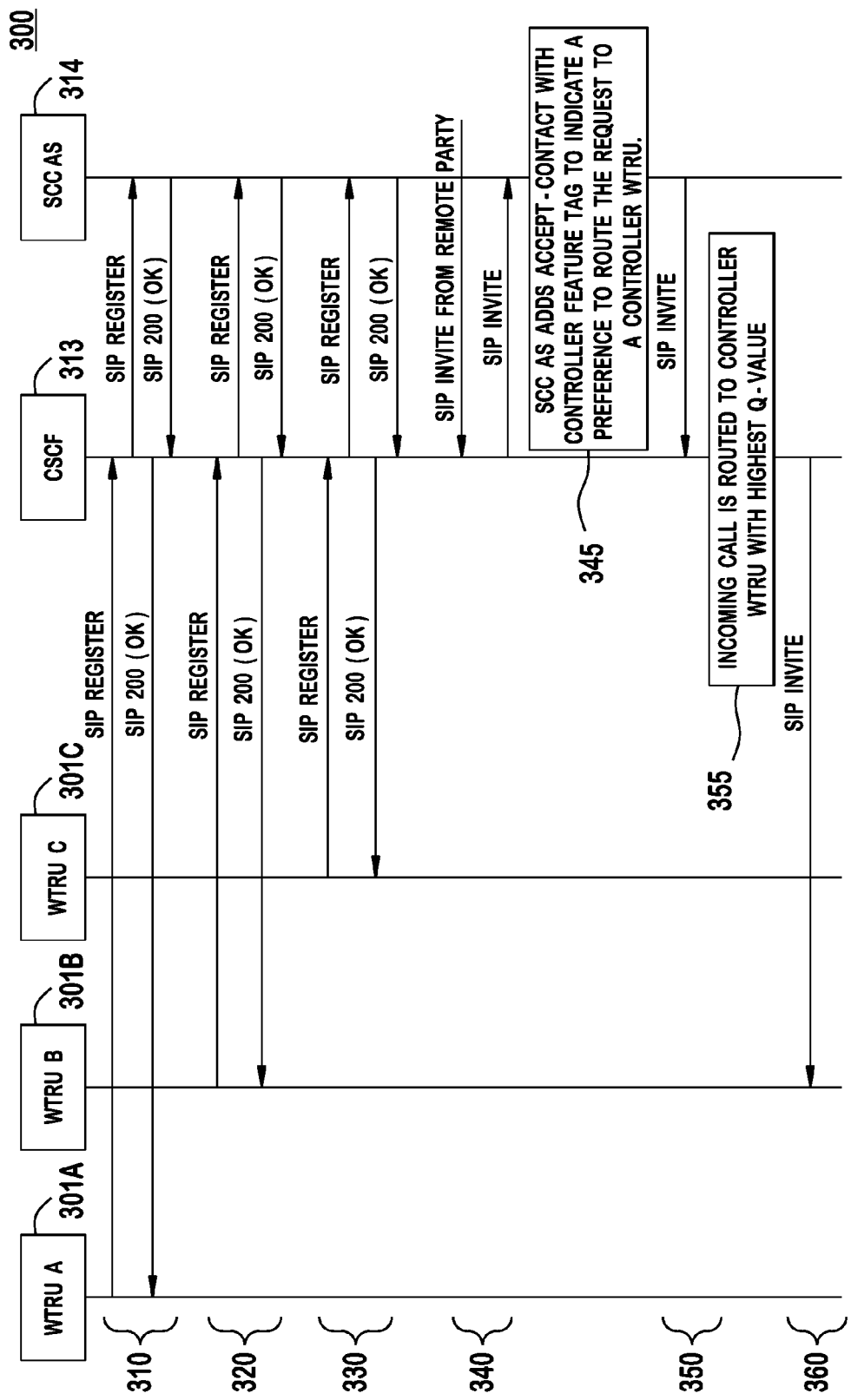
FIG. 3 shows an information flow for WTRU registration and IMS session routing in accordance with a described embodiment.

FIG. 3 shows an information flow for WTRU registration and IMS session routing in accordance with this embodiment. In FIG. 3, WTRU A 301, which is IMS-capable, seeks to register its capabilities and a priority value with the IMS network. WTRU A 301A sends an SIP REGISTER request 310 to an IMS CSCF 313. The SIP REGISTER request 310 has a Contact header field that includes both a feature tag indicating a capability of WTRU A 301 and a q-value indicating a priority value associated with WTRU A 301A. In FIG. 3, the feature tag indicating controller capability of WTRU A 301A is g.3gpp.controller="controller" and the q-value indicating a priority value associated with WTRU A 301A is q=0.5.

CSCF 313 sends the SIP REGISTER request 310 to SCC AS 314 and CSCF 313 sends an SIP 200 (OK) response 310 to WTRU A 301A. SCC AS 314 also sends an SIP 200 (OK) response 310 to CSCF 313. As a result, WTRU A 301A has registered its capability and a priority value with the IMS network. WTRU B 301B and WTRU C 301C similarly register 320, 330 their capabilities and associated priority values with the IMS network. WTRUs A-C 301A-C are registered under the same PUI with the IMS network. WTRU B 301B registers a feature tag indicating controller capability and q-value of q=0.8, while WTRU C 301C registers no feature tag indicating control capability, but registers a q-value of q=0.5.

CSCF 313 receives an SIP INVITE request 340 from a remote party (not shown) for a media session. The SIP INVITE request 340 is addressed to the PUI shared by WTRUs A-C 301A-C. CSCF 313 sends the SIP INVITE request 340 to SCC AS 314. SCC AS 314 prefers that the SIP INVITE request be routed to a controller WTRU. SCC AS 314 uses RFC 3841 procedures and adds an Accept-Contact 345 with a controller feature tag to indicate this preference in the SIP INVITE request. SCC AS 314 sends the SIP INVITE request 350 to CSCF 313.

WTRU A 301A and WTRU B 301B have controller capabilities, while WTRU C 301C does not have such capabilities. CSCF 313 may therefore send the SIP INVITE request to either WTRU A 301A or WTRU B 301B, but not WTRU C 301C. WTRU B 301B has a higher associated q-value than WTRU A 301A, so CSCF 313 determines that the SIP INVITE request is directed to the controller WTRU with the higher q-value 355 and then sends the SIP INVITE request 360 to WTRU B 301B. Rather than forking, i.e., sending the SIP INVITE request to both WTRU A 301A and WTRU B 301B, the CSCF 313 sends the SIP INVITE request to WTRU B 301B.

Multiple SCC ASs may be involved in an IMS session, with each SCC AS serving one WTRU or multiple WTRUs. This may be the case where multiple WTRUs are involved in a collaborative IMS session and the WTRUs are served by multiple SCC ASs. For example, one SCC AS may be an anchor SCC AS for the collaborative session, and the remaining SCC ASs may proxy messages for the anchor SCC AS.

The WTRUs involved in an IMS session may have different SCC ASs because the WTRUs are under different IMS subscriptions or are served by different IMS networks. The SCC AS serving the WTRU that initiated the IMS session may function as an anchor SCC AS until the anchor point is transferred to another SCC AS. The initiating WTRU may have involved other WTRUs in the IMS session (for example, by transferring, duplicating, or establishing IMS media sessions to these WTRUs). The SCC ASs serving the other WTRUs may, therefore, act as proxies to the SCC AS of the initiating WTRU.

Figure 4:
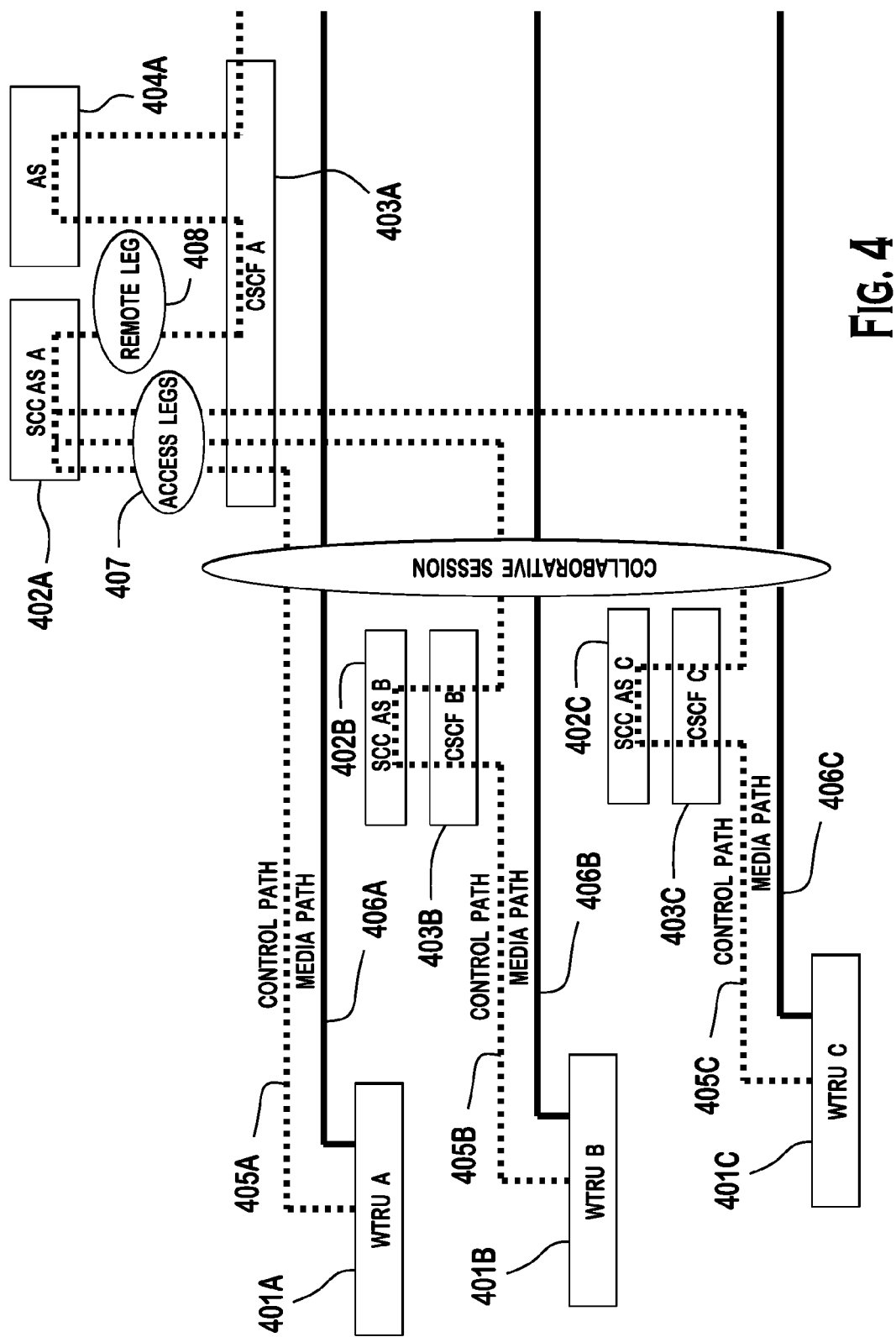
FIG. 4 shows multiple WTRUs served by multiple IMS networks in a IMS collaborative session.

FIG. 4 shows multiple WTRUs served by multiple IMS networks in an IMS collaborative session. WTRUs 401A-C (collectively hereinafter referred to by the numeral alone, WTRUs 401) are each served by SCC AS 402A-C, respectively, within their respective IMS networks. SCC AS A 402A is the anchor whose policies govern the IMS session. Further, the anchor SCC AS A 402A enables service continuity for media sessions amongst all WTRUs 401. SCC AS B 402B and SCC AS C 402C serve WTRU B 401B and WTRU C 402C, respectively, where WTRU B 402B and WTRU C 402C may belong to different IMS subscriptions. In a collaborative session anchored at SCC AS A 402A, SCC AS B 402B and SCC AS C 402C as act proxies for messages between WTRU B 401B and WTRU C 401C, respectively, and SCC AS A 402A.

In FIG. 4, an access leg 407 is presented to anchor SCC AS A 402A and a remote leg 408 is presented to SCC AS A 402A from a remote party (not shown). WTRUs 401 each have a control path 405 with their respective SCC ASs 402 and a media path 406 with the remote party. Furthermore, each of the IMS networks has a CSCF 403A-C.

An SCC AS may use control signaling to identify itself as an anchor to other SCC ASs. Additionally, an anchor SCC AS may transfer the anchor point from itself to another SCC AS via control signaling or a non-anchor SCC AS may request the transfer of the anchor point from an anchor SCC AS via control signaling.

Signaling between SCC ASs may be dedicated for the purposes of anchor identification and transfer or the signaling may be incorporated or contained within IMS signaling. For instance, an anchor SCC AS may identify itself as such by incorporating control signaling to that effect within an IMS control message that was routed through a non-anchor SCC AS but was intended for a WTRU served by the non-anchor SCC AS. Thereby, a non-anchor SCC AS routing a message to the WTRU it is serving may be informed of the identity of the anchor SCC AS via the message. A non-anchor may remove the signaling incorporated in the message and pass the message to its intended party, the WTRU. As a result, this anchor signaling may in a sense "ride" conventional IMS signaling.

For security purposes, it may be preferable that only SCC ASs within IMS networks be aware of the anchor SCC AS. Accordingly, signaling for the purpose of anchor identification and transfer that is incorporated in IMS signaling may be removed by the SCC AS recipient before the IMS signaling is passed along to WTRUs.

An SIP header may be utilized by SCC ASs to identify an anchor SCC AS and to transfer the anchor from one SCC AS to another SCC AS. A private header, or a P-Header, is one example of an SIP header field that may be utilized for these purposes. A P-Header labeled as P-Anchor-Point-ID may be used to identify an anchor point. For instance, P-Anchor-Point-ID: sccas1@example.com may be used to identify an anchor SCC AS by its address, sccas1@example.com, whereby, an anchor SCC AS may insert this header field in IMS SIP signaling to identify itself as an anchor SCC AS to other SCC ASs. Particularly, within a trusted network or domain, where it is unlikely that an SCC AS who is not an anchor will identify itself as such.

In another embodiment, an SCC AS may request anchor transfer by changing the P-Anchor-Point-ID address from the address of the current anchor SCC AS to the address of the SCC AS to which anchor point transfer is sought.

Parameters may be added to this header for transferring the SCC AS anchor. For example, transfer-anchor-point-to may be used by an anchor SCC AS to transfer the anchor point to another SCC AS identified by the parameter. For example, the P-Header P-Anchor-Point-ID: sccas1@example.com; transfer-anchor-to: sccas2@example.com may be inserted by an SCC AS in an SIP message to identify itself as an anchor point and to request transfer of the anchor point to another SCC AS (identified by its address, sccas2@example.com).

In another embodiment, a header field utilized for the purpose of anchor identification or transfer may comprise multiple parameters. An inserted-by parameter may identify the SCC AS that inserted the header in the SIP message. An Action parameter may allow an SCC AS to notify other SCC ASs of the purpose of the header field. The Action header field may identify the anchor point, request anchor transfer to another SCC AS, request anchor transfer from the anchor SCC AS to another SCC AS, or reject a requested anchor transfer. Table 1 shows instances of Action parameter fields and their associated meanings.

TABLE 1

Action parameter fields

| Action parameter | Purpose | Accompanied by: |
|---|---|---|
| anchor-point | Identifies the anchor | |
| request-anchor | Request anchor transfer from an anchor SCC AS | request-To* |
| transfer-anchor | Request anchor transfer to another SCC AS | request-To* |
| reject-anchor | Reject the request of anchor transfer | |

*Identifies SCC AS the request is addressed to

Accordingly, if an anchor SCC AS with the address sccas1@example.com seeks to transfer the anchor point to another SCC AS with the address sccas2@example.com, the anchor SCC AS may utilize the header P-Anchor-Point-ID: inserted-by: sccas1@example.com Action: transfer-anchor request-to: sccas2@example.com. Then, if the non-anchor SCC AS with the address sccas2@example.com accepts the anchor point transfer, the non-anchor SCC AS may respond by utilizing the header P-Anchor-Point-ID: Inserted-by: sccas2@example.com Action: anchor-point. Alternatively, if the non-anchor SCC AS rejects the anchor point transfer, it may respond by utilizing the header P-Anchor-Point-ID: Inserted-by: sccas2@example.com Action: reject-anchor.

Figure 5:
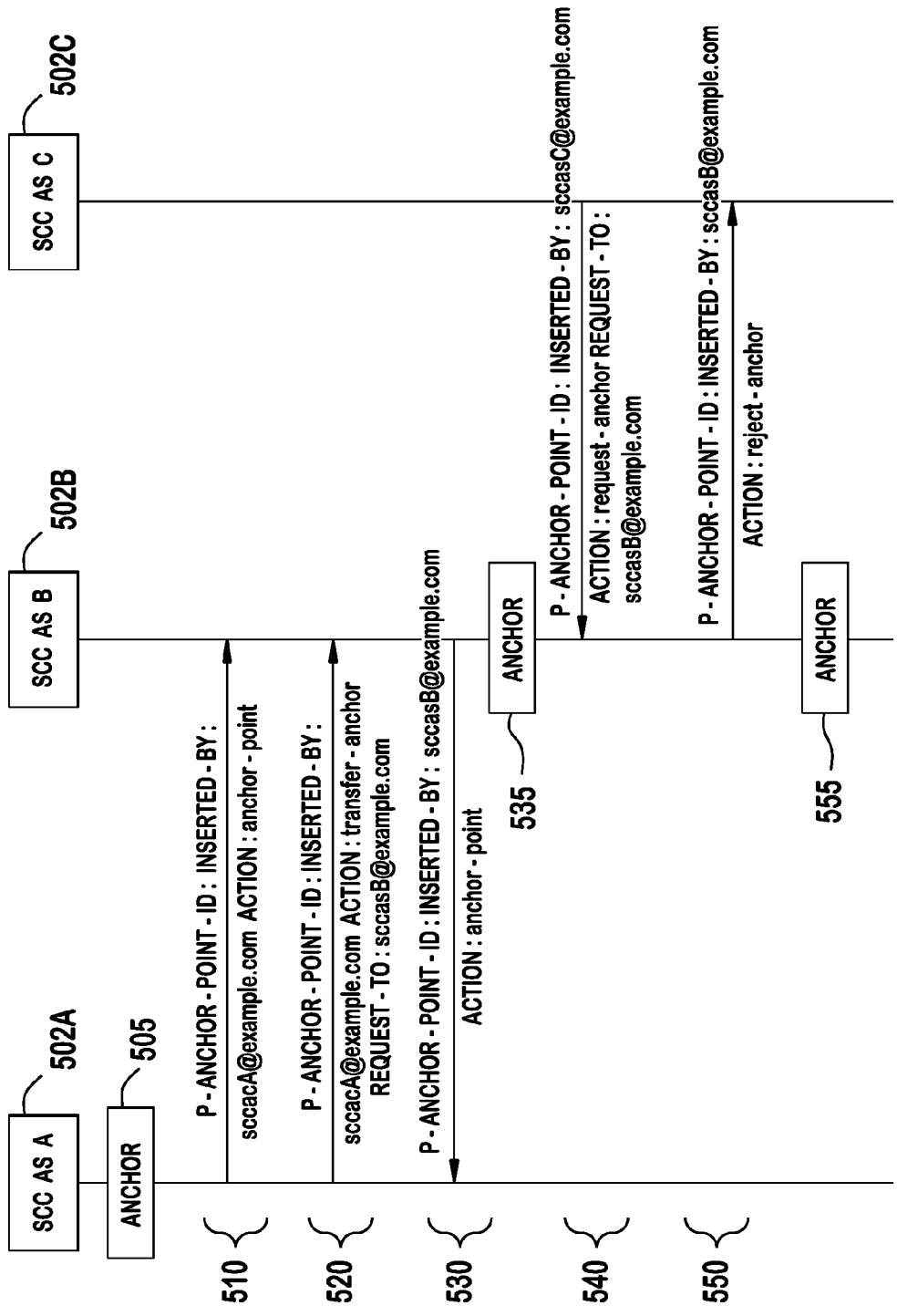
FIG. 5 shows an information flow for anchor Service Centralization and Continuity Application Server (SCC AS) identification and transferring in accordance with a described embodiment.

FIG. 5 shows an information flow for anchor SCC AS identification and transferring in accordance with this embodiment. In FIG. 5, SCC AS A 502A is an anchor SCC AS 505 for an ongoing IMS session, whereas SCC AS B 502B and SSC AS C 502C are non-anchors. Each SCC AS 502A-C may serve IMS-capable WTRUs (not shown), with SCC AS B 502B and SCC AS C 502C acting as proxies for the IMS signaling between their respective WTRUs and anchor SCC AS A 502A. The WTRUs, which belong to different IMS networks, may be involved in a collaborative IMS session. SCC AS A 502A identifies itself as an anchor by including an SIP header in an SIP message to SCC AS B 502B 510. This SIP header may be part of an SIP message sent solely to convey this anchor information, or, alternatively, the header may simply be incorporated into an SIP message intended for a party other than SCC AS B 502B. For instance, the header may be included in an SIP message to the WTRU served by SCC AS B 502B. When it receives the message, SCC AS B 502B may then remove the header information and, in its role as a proxy, convey the remainder of the SIP message to the WTRU it is serving.

SCC AS A 502A requests to transfer the anchor point to SCC AS B 502B by including an SIP header in an SIP message to SCC AS B 502B 520. SCC AS B 502B accepts the anchor point transfer by including an SIP header in an SIP message to SCC AS A 502A 530. Thereby, SCC AS B 502B becomes the anchor SCC AS 535. SCC AS C 502C then requests that the anchor point be transferred to itself from SCC AS B 502B by including an SIP header in an SIP message to SCC AS B 502B 540. SCC AS B 502B does not wish to relinquish the anchor point so it rejects the anchor point transfer request by including an SIP header in an SIP message to SCC AS C 502B 550, whereby SCC AS B 502B remains the anchor SCC AS 555.

In another embodiment, an SIP XML body may be utilized for anchor identification and transfer. An anchor SCC AS may identify itself as such to other SCC ASs by utilizing an XML body. An SCC AS may also include the type of action an SCC AS seeks to carry out, such as maintaining the anchor point or requesting anchor point transfer. Additionally, the XML body may include the identity of the SCC AS to which anchor point transfer is desired or the identity of a non-anchor SCC AS seeking anchor transfer.

In another embodiment, an SCC AS may identify itself as an anchor SCC AS by including its address in a Call-Info header of an SIP message, such as Call-Info: sccas1@example.com; purpose=anchor. In another embodiment, an anchor SCC AS may identify itself as such in a Record-Route header. For instance, it may add a parameter, e.g. "anchor-point", to its address in the Record-Route header of an SIP message. For example Record-Route: sccas1@example.com; anchor-point identifies SCC AS with the address sccas1@example.com as an anchor point.

In an IMS collaborative session, session control is maintained by a controller WTRU, while other WTRUs who are involved in the collaborative session are controllee WTRUs. A controller WTRU may identify itself as a collaborative session controller to an IMS network or other WTRUs that are involved in a collaborative session. Furthermore, a controller WTRU may transfer collaborative session control to another WTRU, making the WTRU receiving collaborative session control the new controller WTRU.

In an IMS network, SIP signaling may be used to indicate the identity of a collaborative session controller WTRU. Furthermore, SIP control signaling may be used to transfer collaborative session control. An SIP XML body may comprise information elements indicating the controller WTRU for a collaborative session. Additionally, the XML body may be used in IMS control signaling for the purpose of transferring collaborative session control from one WTRU to another WTRU. For instance, a controller WTRU may use an SIP XML body to request that another WTRU assume collaborative session control. Collaborative session control may be accepted or rejected and the WTRU accepting or rejecting the transfer of collaborative session control may indicate so in an SIP XML body. Furthermore, a controllee WTRU may use an SIP XML body to request that collaborative session control be transferred to it from a controller WTRU.

In another embodiment, a controller WTRU in a collaborative session may include a parameter in the SIP Contact header field indicating whether it seeks to retain or transfer collaborative session control. For example, the presence of the parameter "controller" in the Contact header field informs the SCC AS and the IMS network that the WTRU seeks to maintain collaborative session control.

In another embodiment, a P-Header may be used for transferring collaborative session control. The P-Header may have a Controller parameter that identifies the collaborative session controller. It may also have an Action parameter that indicates a request by the controller WTRU to transfer collaborative session control to another WTRU or a request by a controllee WTRU to obtain collaborative session control from the controller WTRU. The P-Header may also have a parameter to indicate the WTRU to which the Action parameter relates. For instance, the SIP header P-Session-Control: Controller=wtruA@example.com; Action=transfer; Request-to=wtruB@example.com may be included by WTRU A in an SIP message such as REFER or Re-INVITE to request transfer of collaborative session control to WTRU B. WTRU B may either accept or reject this request by including an SIP header in an SIP message to WTRU A.

In another embodiment, collaborative session control may be transferred by changing the contact address that the IMS network affiliates with the controller WTRU. In this embodiment, if the IMS network was previously receiving IMS signaling with a contact address for one controller WTRU, collaborative session control transfer may be indicated by the IMS network receiving IMS signaling with a contact address for another controller WTRU, where both WTRUs are in a collaborative session. The change of contact address may be indicated together with the "controller" feature tag, which indicates that a device has controller capabilities. The presence of the feature tag in requests means a WTRU is the controller, while the absence of the feature tag means another WTRU with controller capabilities may take control of the collaborative session. Accordingly, the presence or absence of the controller feature tag may prompt the SCC AS to change the contact address that the IMS network identifies as the contact address for the controller WTRU.

Figure 6:
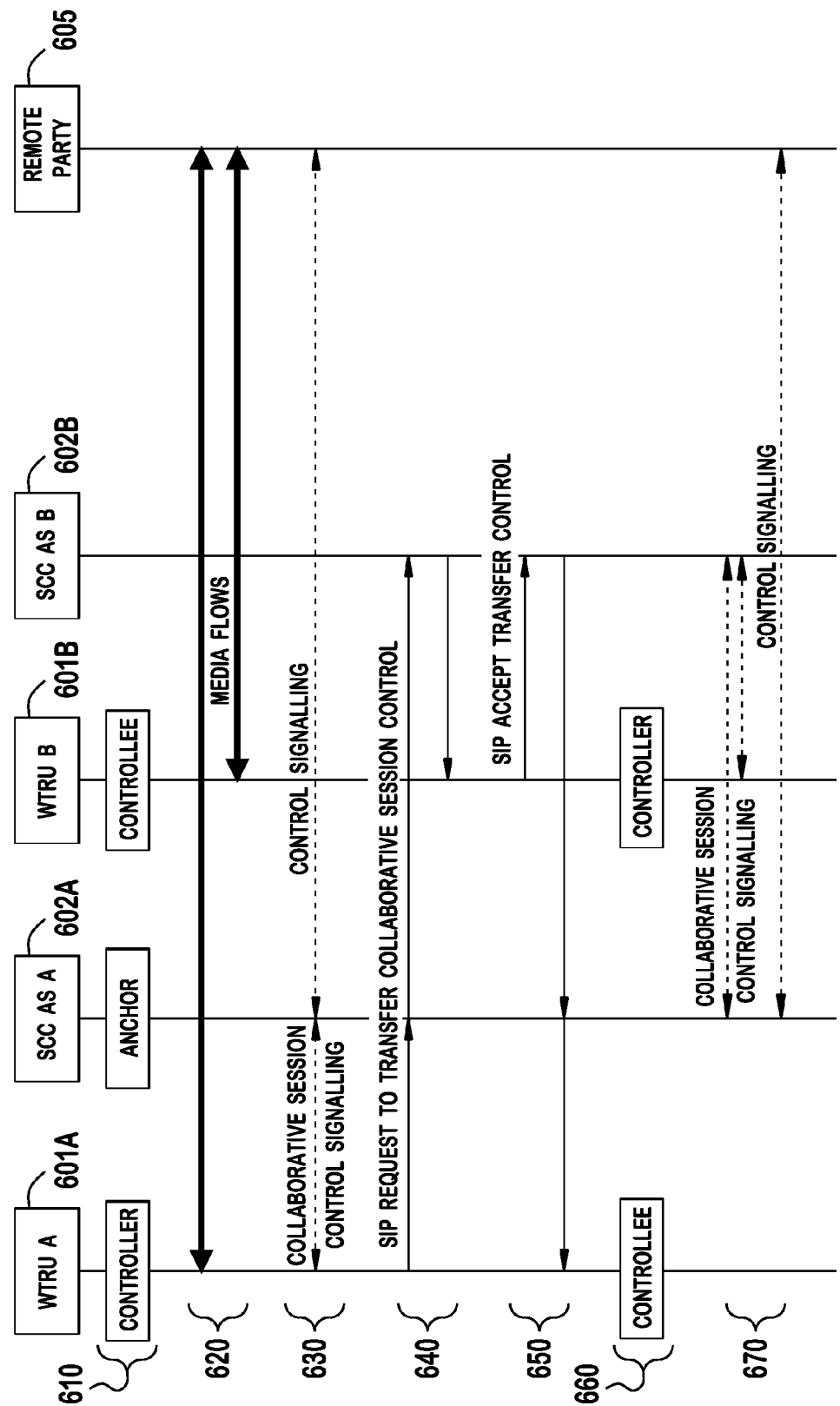
FIG. 6 shows an information flow for the transfer of IMS collaborative session control.

FIG. 6 shows an information flow for the transfer of IMS collaborative session control. In FIG. 6, WTRU A 601A and WTRU B 601B are engaged in a collaborative session with a remote party 605. SCC AS A 602A serves WTRU A 601A and SCC AS B 602B serves WTRU B 601B. For this collaborative session, WTRU A 601A maintains collaborative session control. WTRU A 601A is a controller WTRU, WTRU B 601B is a controllee WTRU, and SCC AS A 602A is the anchor SCC AS for the collaborative session 610. Each WTRU 601A-B has a media flow with the remote party 605 520.

As a controller WTRU, WTRU A 601A maintains collaborative session control signaling with SCC AS A 602A and the remote party 605 630. WTRU A 601A seeks to transfer collaborative session control to WTRU B 601B. WTRU A 601A sends an SIP request to WTRU B 601B to transfer collaborative session control, in accordance with the embodiments described herein 640. WTRU B 601B accepts transfer of collaborative session control and sends an SIP message to WTRU A 601A indicating its acceptance of collaborative session control, in accordance with the embodiments described herein 650. Thereby, WTRU B 601B becomes the controller WTRU and WTRU A 601A becomes the controllee WTRU for the collaborative session 660. As a controller WTRU, WTRU B 601B maintains collaborative session control signaling with SCC AS A 602A and the remote party 605 670, where SCC AS A 602A acts as an anchor SCC AS and SCC AS B 602B proxies the messaging between WTRU B 601B and SCC AS A 602A.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method comprising:
   a first Service Centralization and Continuity (SCC) Application Server (AS) (SCC AS) initially acting as an anchor point for a first Internet Protocol (IP) Multimedia Subsystem (IMS) session, the first IMS session involving at least a first wireless transmit/receive unit (WTRU) that is served by the first SCC AS, a second WTRU that is served by a second SCC AS that initially acts as an anchor proxy for the first IMS session, and a remote party;
   the first SCC AS transmitting an anchor-transfer message to the second SCC AS, the anchor-transfer message indicating a request that the second SCC AS act as the anchor point for the first IMS session; and
   the first SCC AS receiving an anchor-transfer response from the second SCC AS, wherein the first SCC AS responsively ceases acting as the anchor point for the first IMS session if the received anchor-transfer response indicates acceptance by the second SCC AS of the request that the second SCC AS act as the anchor point for the first IMS session.

2. The method of claim 1, further comprising:
   the first SCC AS, prior to transmitting the anchor-transfer message to the second SCC AS, transmitting an anchor-point message to the second SCC AS, the anchor-point message indicating that the first SCC AS is acting as the anchor point for the first IMS session.

3. The method of claim 1, wherein transmitting the anchor-transfer message to the second SCC AS comprises transmitting the anchor-transfer message to the second SCC AS using inter-SCC-AS control signaling that is dedicated for anchor identification and transfer.

4. The method of claim 1, wherein transmitting the anchor-transfer message to the second SCC AS comprises transmitting the anchor-transfer message to the second SCC AS using anchor-identification-and-transfer control signaling that is incorporated within IMS signaling.

5. The method of claim 4, wherein at least one of the first SCC AS and the second SCC AS is configured to remove any anchor-identification-and-transfer control signaling that is incorporated within IMS signaling from such IMS signaling prior to forwarding such IMS signaling to one or more WTRUs.

6. The method of claim 1, wherein transmitting the anchor-transfer message to the second SCC AS comprises transmitting the anchor-transfer message to the second SCC AS in a header of a Session Initiation Protocol (SIP) message.

7. The method of claim 6, wherein the header is a private header.

8. The method of claim 1, wherein transmitting the anchor-transfer message to the second SCC AS comprises transmitting the anchor-transfer message to the second SCC AS in an Extensible Markup Language (XML) body of a Session Initiation Protocol (SIP) message.

9. The method of claim 1, wherein the received anchor-transfer response indicates acceptance by the second SCC AS of the request that the second SCC AS act as the anchor point for the first IMS session, and wherein the second SCC AS begins acting as the anchor point for the first IMS session.

10. The method of claim 1, wherein the received anchor-transfer response indicates rejection by the second SCC AS of the request that the second SCC AS act as the anchor point for the first IMS session, and wherein the first SCC AS responsively continues acting as the anchor point for the first IMS session.

11. A method comprising:
    a first Service Centralization and Continuity (SCC) Application Server (AS) (SCC AS) initially acting as an anchor proxy for a first Internet Protocol (IP) Multimedia Subsystem (IMS) session, the first IMS session involving at least a first wireless transmit/receive unit (WTRU) that is served by the first SCC AS, a second WTRU that is served by a second SCC AS that initially acts as an anchor point for the first IMS session, and a remote party;

the first SCC AS transmitting an anchor-request message to the second SCC AS, the anchor-request message indicating a request that the first SCC AS act as the anchor point for the first IMS session; and the first SCC AS receiving an anchor-request response from the second SCC AS, wherein the first SCC AS responsively begins acting as the anchor point for the first IMS session if the received anchor-request response indicates acceptance by the second SCC AS of the request that the first SCC AS act as the anchor point for the first IMS session.

12. The method of claim 11, further comprising:
the first SCC AS, prior to transmitting the anchor-request message to the second SCC AS, receiving an anchor-point message from the second SCC AS, the anchor-point message indicating that the second SCC AS is acting as the anchor point for the first IMS session.

13. The method of claim 11, wherein transmitting the anchor-request message to the second SCC AS comprises transmitting the anchor-request message to the second SCC AS using inter-SCC-AS control signaling that is dedicated for anchor identification and transfer.

14. The method of claim 11, wherein transmitting the anchor-request message to the second SCC AS comprises transmitting the anchor-request message to the second SCC AS using anchor-identification-and-transfer control signaling that is incorporated within IMS signaling.

15. The method of claim 14, wherein at least one of the first SCC AS and the second SCC AS is configured to remove any anchor-identification-and-transfer control signaling that is incorporated within IMS signaling from such IMS signaling prior to forwarding such IMS signaling to one or more WTRUs.

16. The method of claim 11, wherein transmitting the anchor-request message to the second SCC AS comprises transmitting the anchor-request message to the second SCC AS in a header of a Session Initiation Protocol (SIP) message.

17. The method of claim 16, wherein the header is a private header.

18. The method of claim 11, wherein transmitting the anchor-request message to the second SCC AS comprises transmitting the anchor-request message to the second SCC AS in an Extensible Markup Language (XML) body of a Session Initiation Protocol (SIP) message.

19. The method of claim 11, wherein the received anchor-request response indicates acceptance by the second SCC AS of the request that the first SCC AS act as the anchor point for the first IMS session, and wherein the second SCC AS begins acting as an anchor proxy for the first IMS session.

20. The method of claim 11, wherein the received anchor-request response indicates rejection by the second SCC AS of the request that the first SCC AS act as the anchor point for the first IMS session, and wherein the first SCC AS responsively continues acting as an anchor proxy for the first IMS session.

* * * * *